(12) United States Patent
Waser

(10) Patent No.: US 7,740,701 B2
(45) Date of Patent: Jun. 22, 2010

(54) ADHESIVE COMPOSITION WITH LIGHTWEIGHT FILLER

(75) Inventor: Hanspeter Waser, Hildisrieden (CH)

(73) Assignee: Akzo Nobel N.V., Arnhem (NL)

( * ) Notice: Subject to any disclaimer, the term of this patent is extended or adjusted under 35 U.S.C. 154(b) by 1030 days.

(21) Appl. No.: 11/341,218

(22) Filed: Jan. 26, 2006

(65) Prior Publication Data

US 2006/0169183 A1 Aug. 3, 2006

(30) Foreign Application Priority Data

Jan. 31, 2005 (DE) ........................ 10 2005 004 362

(51) Int. Cl.
*C04B 24/00* (2006.01)
(52) U.S. Cl. ................ 106/728; 106/729; 106/730
(58) Field of Classification Search .............. 106/728, 106/729, 730
See application file for complete search history.

(56) References Cited

U.S. PATENT DOCUMENTS

| | | | | |
|---|---|---|---|---|
| 4,211,572 A | * | 7/1980 | Wagner et al. | 106/727 |
| 5,277,712 A | * | 1/1994 | McInnis | 106/774 |
| 5,362,320 A | * | 11/1994 | Whatcott | 106/709 |
| 5,746,822 A | | 5/1998 | Espinoza et al. | |
| 6,709,508 B2 | | 3/2004 | Dietrich et al. | |
| 2003/0005861 A1 | | 1/2003 | Dietrich et al. | |

FOREIGN PATENT DOCUMENTS

| | | |
|---|---|---|
| DE | 32 43 573 | 5/1984 |
| DE | 101 23 938 | 11/2002 |
| DE | 101 37 231 | 2/2003 |
| DE | 10315865 | 4/2004 |
| EP | 0 839 774 | 5/1998 |
| EP | 0985646 | 3/2000 |
| EP | 0990628 | 4/2000 |
| EP | 1281693 | 2/2003 |
| GB | 2 335 657 | 9/1999 |
| JP | 2001-348286 | 12/2001 |
| WO | WO9310054 | 5/1993 |
| WO | WO 98/54108 | 12/1998 |

OTHER PUBLICATIONS

JP 62052156 (Kobayashi et al.) Mar. 6, 1987 abstract only.*
Definition of Marble, Wikipedia, http://en.wikipedia.org/wiki/Marble, retrieved on Jul. 9, 2009.
Search Report, European Application No. EP 06 00 1423, dated Nov. 19, 2008 (translated).

* cited by examiner

*Primary Examiner*—Paul Marcantoni
(74) *Attorney, Agent, or Firm*—Kenyon & Kenyon LLP

(57) ABSTRACT

A hydraulically setting mortar composition containing at least one hydraulically setting component, at least one lightweight filler, at least one cellulose ether, at least one setting retarder and optionally further additional additives, particularly fillers and/or dispersion powders. In addition, a premix for producing a hydraulically setting mortar composition is described containing at least one lightweight filler and at least one cellulose ether and/or a setting retarder. As a result of the inventive ratio of these components, it is possible with much lower lightweight filler contents to obtain more cost effective mortar formulations and/or improved use characteristics, such as e.g. increased adhesive tensile strengths and/or an increased open time. The hydraulically setting mortar composition can be used in gypsum, gypsum-lime, lime-cement, cement and/or thermal plasters, tile adhesives, masonry mortars, full heat protection mortars, surfacers, self-levelling floor materials or repair mortars.

23 Claims, No Drawings

ADHESIVE COMPOSITION WITH LIGHTWEIGHT FILLER

FIELD OF THE INVENTION

The invention relates to a hydraulically setting mortar composition having a content of lightweight fillers, cellulose ethers and setting retarders.

BACKGROUND OF THE INVENTION

Increasingly lightweight fillers have recently been used in the formulation of hydraulically setting mortars, such as tile adhesives. This makes it possible to increase the mixing water requirement and reduce the density of the mixed mortar, which gives rise to an easily appliable, very productive mass. In order to obtain such characteristics, generally use is made of higher proportions of up to 20% or higher of relatively expensive lightweight fillers.

EP 985 646 A1 describes Portland cement-based masonry mortars containing a lightweight aggregate. Through the choice of a suitable screen fraction of the dense rock and also the porous lightweight aggregate, it is possible to provide a mortar solving the hole bridging problem. Cellulose ethers and in particular setting retarders can be used, but are not absolutely necessary.

EP 990 628 A1 describes a dry mortar mixture for producing a lightweight masonry mortar, which essentially contains cement, air-entraining additives and selected lightweight aggregates such as perlite and expanding glass and in particular the bulk density and particle size of the perlite and expanding glass must satisfy narrow criteria and must always be used together in large quantities. This gives rise to a lightweight masonry mortar fulfilling the requisite compressive strength characteristics and which additionally has an improved thermal insulation capacity. Setting retarders are not used.

EP 646 100 A1 describes a plaster and/or a colouring product for use on a facade containing as the hydraulically setting component solely aluminate cement (high-alumina cement). In order to slow down the resulting very rapid hydration, use is also made of trisodium citrate as a setting retarder. As fillers it is inter alia possible to use lightweight fillers, the filler proportion of 60 to 95 wt.-% being very high. Efflorescences can be drastically reduced due to the rapid setting. No distinction is made between fillers and lightweight fillers and the quantity ranges of the individual components and precise formulation details are not given.

DE 103 15 865 B3 describes hydraulically setting tile adhesives containing a metakaolin component. This can also be used in formulations with lightweight fillers in order to obtain the requisite adhesive tensile strength characteristics and deformability characteristics according to DIN EN 12002 of 2.5 mm or higher. There is no need to use cellulose ethers and in particular lightweight fillers and setting retarders.

The problem of the present invention is to provide a hydraulically setting mortar composition in which the action of lightweight fillers is increased by a multiple without having to accept losses with regards to the freshly mixed mortar characteristics such as processability, stability, setting behaviour, high productiveness and increased mixing water requirement. This is intended to provide a cost effective formulation with constant characteristics, which also leads to logistic advantages, because the voluminous lightweight filler can e.g. be replaced by compact quartz sand. It must additionally be possible to improve the correctability, open time and/or physical mortar characteristics such as adhesive tensile strength and horizontal deformation of the completely hardened mortar. A premix is also to be made available by means of which the lightweight filler or a large part thereof in mortar compositions can be replaced in order to obtain the indicated advantages of the mortar composition in a simple manner, also in the case of existing formulations. By means of such a premix, a user must be able to bring about a formulation adjustment or adaptation with very low development costs, the use characteristics with lower raw material and production costs remaining the same or can even be improved. Such a premix is also to be used in order to significantly improve the characteristics profile of mortar formulations without lightweight fillers through the use of a premix and without high development costs, so that the typical processing characteristics for lightweight filler-containing mortars are maintained.

SUMMARY OF THE INVENTION

It has surprisingly been found that the set problem can be solved with a hydraulically setting mortar composition containing at least one hydraulically setting component, at least one lightweight filler, at least one cellulose ether and at least one setting retarder, in which
 a. for a mixing water requirement of approximately 20 to 45 wt.-%, based on the dry content of the mortar composition,
  a1. the weight ratio of the lightweight filler to the cellulose ether is approximately 0.001:1 to 10:1 and
  a2. the weight ratio of the setting retarder to the cellulose ether is approximately 0.3:1 to 10:1 and
 b. in the case of a mixing water requirement of approximately 45 to 100 wt.-%, based on the dry content of the mortar composition,
  b1. the weight ratio of lightweight filler to cellulose ether is approximately 0.01:1 to 30:1 and
  b2. the weight ratio of setting retarder to cellulose ether is 0.07:1 to 10:1 and
 c. the lightweight filler used has a bulk density of less than approximately 600 g/l and at ambient temperature a water absorption capacity of approximately 80 wt.-% or higher.

In another embodiment a premix for producing a hydraulically setting mortar composition can be used, in which the premix contains at least one lightweight filler, at least one cellulose ether and at least one setting retarder, wherein
 a. the weight ratio of lightweight filler to cellulose ether is approximately 0.001:1 to 100:1 and/or
 b. the weight ratio of lightweight filler to setting retarder is approximately 0.01:1 to 100:1, particularly approximately 0.1:1 to 75:1 and optionally
 c. the weight ratio of setting retarder to cellulose ether is approximately 0.07:1 to 10:1 and
 d. the lightweight filler used has a bulk density of less than approximately 600 g/l and at ambient temperature has a water absorption capacity of approximately 80 wt.-% or higher.

This premix can be used in existing lightweight filler-containing mortars and all or a large part of the lightweight filler can be replaced by said premix, the weight proportion of the premix only being a small fraction of the weight proportion of the lightweight filler replaced by it. However, a suitable premix can be used for modifying existing mortars not modified by lightweight fillers in such a way that the characteristics profile thereof can be compared with those of lightweight filler-containing mortars. For this it is merely necessary to have a small proportion of premix and a slightly increased cement quantity.

DETAILED DESCRIPTION OF THE PREFERRED EMBODIMENTS

The inventive, hydraulically setting mortar compositions contain one or more hydraulically setting components with a proportion of approximately 5 to 70 wt.-%, particularly approximately 10 to 60 wt.-%, one or more lightweight fillers with a proportion of approximately 0.1 to 20 wt.-%, particularly approximately 0.5 to 15 wt.-%, one or more cellulose ethers with a proportion of approximately 0.02 to 3.0 wt.-%, particularly approximately 0.05 to 2.0 wt.-%, one or more setting retarders with a proportion of approximately 0.01 to 2 wt.-%, particularly approximately 0.02 to 1 wt.-%, one or more fillers or aggregates with a proportion of approximately 0 to 70 wt.-%, particularly approximately 10 to 60 wt.-% and one or more dispersion powders with a proportion of approximately 0 to 25 wt.-%, particularly approximately 0.5 to 20 wt.-%, based on the dry mortar composition. Expanding agents such as aluminium powder can also be used in the mortar formulation, but are less preferred.

The hydraulically setting components are in particular Portland cement, e.g. according to EN 196 CEM I, II, III, IV and V, calcium sulphate in the form of a and/or β-hemihydrate and/or anhydride, high-alumina cement and/or lime, usually in the form of calcium hydroxide and/or calcium oxide. Preference is given to at least one cement component and in particular this can be systems based on pure Portland cement, or a mixture of Portland cement, high-alumina cement and calcium sulphate. As the filler or further filler can be used an aggregate not covered by the term "lightweight filler", preferably inorganic fillers or inorganic aggregates with a bulk density of approximately 600 g/l or higher and which are generally known to the expert. The preferred fillers and aggregates are quartzite and/or carbonate sands and/or powders, such as e.g. quartz sand and/or limestone powder. For improving the mortars one or more dispersion powders can be added. In special cases in place of or in addition to the dispersion powder it is possible to add during the mixing phase with water a liquid polymer dispersion to the dry mortar. The dispersion powders and polymer dispersions are homopolymers and/or copolymers based on $C_1$ to $C_{20}$ vinyl esters, particularly $C_1$ to $C_{12}$ vinyl esters, ethylene, vinyl chloride, $C_1$ to $C_{20}$ alkyl esters of (meth)acrylic acid, particularly $C_1$ to $C_{12}$ alkyl esters of (meth)acrylic acid, acrylamide, acrylonitrile, styrene, styrene derivatives and/or butadiene.

The presence of one or more setting retarders is very important for acquiring the sought effects. The choice and quantity of the setting retarder is dependent on the individual mortar formulation and can also be dependent on specific raw materials, such as the selected cement. This not only controls the setting rate of the hydraulic component, but also the freshly mixed mortar characteristics of the mixed mortar are optimized. Suitable setting retarders are $C_3$ to $C_{20}$ polyhydroxy compounds, particularly $C_4$ to $C_{12}$ polyhydroxy compounds, such as e.g. sugar alcohol compounds, sugar-like lignin sulphonates, phosphates such as e.g. monocalcium phosphate, alkali metal phosphates, particularly sodium and potassium phosphates, alkali metal phosphonates, alkali metal pyrophosphates such as e.g. tetrasodium pyrophosphate, diphosphate such as e.g. calcium diphosphate, silicophosphonates, water-soluble silicofluorides, particularly magnesium silicofluoride, boric acid, alkali metal borates, $C_1$ to $C_{20}$ carboxylic acids, particularly $C_2$ to $C_{12}$ carboxylic acids such as e.g. citric acid, tartaric acid, alipic acid, gluconic acid, gallic acid, malic acid, tartronic acid, 2,4,6-trihydroxy benzoic acid, heptanoic acid and/or their alkali metal, alkaline earth, ammonium and/or triethanol ammonium salts, zinc oxide, polymethoxy polyphosphonic acid, condensation products of enzymatically obtained protein hydrolyzates, carboxyl group-containing polymers such as polymerized amino acids, carboxyl group-substituted polymeric sugars and modified polyacrylates with relatively low molecular weights. Particular preference is given to $C_4$ to $C_{12}$ polyhydroxy compounds, such as e.g. sorbitol, saccharose, fructose and/or glucose. The amount of setting retarder used is a function of the selected retarder, the desired characteristics profile of the mortar, particularly the freshly mixed mortar, as well as the selected raw materials of the mortar composition. It amounts to approximately 0.01 to 2 wt.-%, particularly approximately 0.025 to 1.5 wt.-% and more particularly approximately 0.05 to 1 wt.-%, based on the dry mortar composition.

Lightweight fillers are additives which can be used in the production of hydraulically setting mortar compositions. As a restriction against fillers or aggregates, they have a much lower bulk density, which gives the mixed mortar as easy processability. The lightweight fillers according to the invention have a bulk density of lower than approximately 600 g/l, particularly lower than approximately 500 g/l and more particularly lower than 400 g/l. It is also important for them to be able to absorb water. This absorption behaviour can be easily tested, in that at ambient temperature e.g. 10.0 g of a lightweight filler are weighed into a beaker and then, accompanied by slight stirring, water is added until there is no clear aqueous phase. Prior to the measurement the mixture is left to stand for 5 minutes. This makes it possible to easily calculate the water absorption capacity of the individual lightweight fillers:

$$\text{Water absorption capacity } (WAC; \text{wt. \%}) = \frac{\text{absorbed water quantity(g)} * 100}{\text{filled lightweight filler quanity(g)}}$$

Table 1 gives the water absorption capacities of a few typical fillers and lightweight fillers or aggregates.

TABLE 1

Water absorption capacity of a few typical fillers and lightweight fillers.

| Filler or lightweight filler | WAC* (wt.-%) | Bulk density (g/l) |
|---|---|---|
| Aluminium-iron-magnesium-silicate | 114 | 120-140 |
| Aluminium-silicon oxide | 163 | 200 |
| Aluminium-silicate | 128 | 180 |
| Aluminium-silicate | 90 | 350-450 |
| Aluminium-silicate | 63 | 450 |
| Aluminium silicate | 60 | 400-450 |
| Aluminium silicate | 91 | 350-450 |
| Aluminium-silicate hydrate | 716 | 54 |
| Calcium-aluminium-silicate | 142 | 400 |
| Calcium-magnesium-carbonate | 30 | 1280 |
| Calcium-magnesium-carbonate | 29 | 1200 |
| Calcium-silicate hydrate | 340 | 60 |
| Calcium-silicate hydrate | 123 | 340-490 |
| Calcium carbonate | 33 | 1500 |
| Calcium carbonate | 27 | 1800 |
| Calcium carbonate | 25 | 1800 |
| Calcium metasilicate | 200 | 200-330 |
| Silica anhydrite + kaolinite | 54 | 250 |
| Magnesium-aluminium-silicate-hydrate | 53 | 660 |
| Magnesium-aluminium-silicate-hydrate | 51 | 750 |
| Magnesium-aluminium-silicate-hydrate | 42 | 870 |

TABLE 1-continued

Water absorption capacity of a few typical
fillers and lightweight fillers.

| Filler or<br>lightweight filler | WAC*<br>(wt.-%) | Bulk<br>density (g/l) |
| --- | --- | --- |
| Magnesium-silicate | 81 | 450 |
| Magnesium-silicate-hydrate | 48 | 720 |
| Silicon dioxide | 180 | 150 |
| Silicon dioxide | 77 | 600-700 |
| Silicon dioxide | 71 | 200-300 |
| Silicon oxide | 420 | 5 |
| Silicon oxide | 30 | 1340 |
| Silicon oxide | 27 | 1400 |

*WAC = water absorption capacity

At ambient temperature the lightweight fillers according to the invention have a water absorption capacity of approximately 80 wt.-% or higher, particularly approximately 100 wt.-% or higher and in particularly preferred manner approximately 120 wt.-% or higher. Otherwise there is no restriction with respect to the lightweight filler or fillers used. To give but a single choice, they can have a synthetic or natural basis, such as hollow microspheres or pellets of glass, polymers such as polystyrene pellets, aluminosilicates, silicon oxide, aluminium-silicon oxide, calcium-silicate hydrate, silicon dioxide, aluminium-silicate, magnesium-silicate, aluminium-silicate hydrate, calcium-aluminium-silicate, calcium-silicate hydrate, aluminium-iron-magnesium-silicate, calcium metasilicate and/or vulcanic scoria. The shape of the lightweight fillers has no restriction and can in particular have a spherical, platelet-like, pin-like and/or lamellar structure. Preferred lightweight fillers are perlite, cellite, Cabosil, Circosil, Eurocell, Fillite, Promaxon, Vermex and/or wollastonite. A specific embodiment is the use of two different lightweight fillers with a different shape, e.g. a combination of spherical and platelet-like or pin-like and lamellar structure.

Due to the greatly increased action according to the invention, the quantities of lightweight fillers used are much lower than in known formulations and are dependent on the individual applications and desired characteristics. A distinction must also be made between hydraulically setting mortar compositions having a lower mixing water content of approximately 20 to 45 wt.-%, based on the dry content of the mortar composition, and those requiring an increased mixing water content of approximately 45 to 100 wt.-% in order to bring about the desired consistency. In the first category the lightweight filler is preferably used in a quantity of approximately 0.1 to 5 wt.-%, particularly approximately 0.2 to 3 wt.-% and in particularly preferred manner approximately 0.5 to 2 wt.-%, based on the dry mortar composition. In the second category the lightweight filler is preferably used in a quantity of approximately 1 to 15 wt.-%, particularly approximately 2 to 10 wt.-% and in particularly preferred manner approximately 3 to 7.5 wt.-%, based on the dry mortar composition.

One or more cellulose ethers can be used. They are preferably selected from the group of alkyl hydroxyalkyl cellulose ethers and/or alkyl cellulose ethers, but can also have some other modification. It is important that the characteristics typical of cellulose ethers are maintained or even improved. The alkyl groups of the alkyl hydroxyalkyl cellulose ethers and/or alkyl cellulose ethers are preferably methyl, ethyl and/or propyl groups and the hydroxyalkyl groups of the alkyl hydroxyalkyl cellulose ether are preferably hydroxymethyl, hydroxyethyl and/or hydroxypropyl groups. The viscosity of the cellulose ether to be used is an important criterion for determining the rheological characteristics of the freshly mixed mortar. The Brookfield viscosity measured at 20 rpm and as a 2% aqueous solution at 20° C. is approximately 100 to 100,000 mPas, particularly approximately 1,000 to 75,000 mPas and in particularly preferred manner approximately 5,000 to 50,000 mPas. The viscosity of the cellulose ether to be used is also highly dependent on the particular use. Thus, in the case of levelling materials preference is given to very low viscosity cellulose ethers, whereas e.g. in applications where a stable rheology is necessary, such as for tile adhesives for the wall, medium to higher viscosity cellulose ethers are preferred. The cellulose ethers can also be modified by suitable additives. The expert is well aware as to how he can adapt in precise manner to his needs the freshly mixed mortar characteristics through the choice of the cellulose ether.

According to the invention, the cellulose ether category also covers compounds which, considered chemically, are not cellulose ethers, but which in the mixed mortar have cellulose ether-typical characteristics, such as e.g. a shear diluting rheology, good air-entraining stability and a high water retention. Compounds with cellulose ether-like characteristics are known to the expert and are preferably used as a partial or complete replacement for cellulose ethers. They are generally based on natural polysaccharides such as e.g. alkyl hydroxyalkyl guar ether, the alkyl and hydroxyalkyl groups being the same as those of the cellulose ethers, or synthetic polysaccharides such as anionic, nonionic or cation heteropolysaccharides, particularly xanthan gum or Wellan gum.

It has surprisingly been found that in the case of a suitable choice of the lightweight filler, the weight ratios of lightweight filler to cellulose ether and setting retarder to cellulose ether play a major part. For constant or even improved mortar characteristics and whilst simultaneously reducing costs, the lightweight filler quantity used can be drastically reduced, provided that in the case of a mixing water content of approximately 20 to 45 wt.-%, based on the dry content of the mortar composition, use is made of a weight ratio of lightweight filler to cellulose ether of approximately 0.001:1 to 10:1, particularly approximately 0.01:1 to 7.5:1 and more particularly approximately 0.1:1 to 5:1, and a weight ratio of setting retarder to cellulose ether of approximately 0.3:1 to 10:1, particularly approximately 0.4:1 to 7.5:1 and more especially approximately 0.5:1 to 5:1. With a mixing water content of approximately 45 to 100 wt.-%, based on the dry content of the mortar composition, the weight ratio of lightweight filler to cellulose ether is approximately 0.01:1 to 30:1, particularly approximately 0.1:1 to 25:1 and more especially approximately 1:1 to 15:1 and a weight ratio of setting retarder to cellulose ether of approximately 0.07:1 to 10:1, particularly approximately 0.09:1 to 7.5:1 and more especially approximately 0.12:1 to 5:1.

In a special embodiment a premix is firstly produced which then before, during or after the production process concerning the hydraulically setting mortar composition can be added to the latter. The advantage of such a premix is that important additives can be more precisely dosed in by means of a premix. Such a premix can be produced in that the inventive lightweight filler, the setting retarder and/or the cellulose ether and optionally further components such as e.g. dispersion powders can be intermixed. It is also possible to only premix part of such a component with another, so that one part of the particular component for the hydraulically setting mortar composition is added during the production process and the other part by means of the premix. For example the setting retarder or part thereof or the cellulose ether or part thereof can be added to the lightweight filler or the dispersion powder. Or the lightweight filler can be mixed together with the entirety or part of the setting retarder and/or with the entirety or part of the cellulose ether. A preferred premix is a mixture of lightweight filler and cellulose ether and/or setting retarder and in each case all or only part of the particular component can be added.

As the premix and the mortar mixture to which the premix is added, can contain cellulose ether, lightweight filler and setting retarder, it is possible for the premix and also the mortar mixture, prior to the addition of the premix, to contain different ratios of lightweight filler to cellulose ether and setting retarder to cellulose ether as compared with the final mortar mixture. In a preferred embodiment the premix contains other lightweight fillers, cellulose ethers and/or setting retarders than in the mortar mixture prior to the addition of the premix, because this further optimizes the characteristics profile of the mortar. According to another, preferred embodiment the entire quantity of the lightweight filler and setting retarder is added to the premix in order to simplify the entire production of the mortar formulation. If as the cellulose ether use is made of a cellulose ether-like compound such as natural or synthetic polysaccharides, preferably the cellulose ether-like compound is used in the premix, but can also be directly added to the mortar mixture, optionally combined with cellulose ethers. In order to obtain this implementation flexibility, it is important that the selected ratios for the premix are more broadly selected than in the finished mortar formulation. In addition, the ratios are less dependent on the mixing water requirement, because the latter is more particularly dependent on the entire formulation, particularly the amount of premix used. Thus, for the premix the weight ratio of lightweight filler to cellulose ether can be approximately 0.001:1 to 100:1, particularly approximately 0.01:1 to 75:1 and more particularly approximately 0.1:1 to 50:1, the weight ratio of lightweight filler to setting retarder approximately 0.01:1 to 100:1, particularly approximately 0.1:1 to 75:1 and more particularly approximately 1:1 to 50:1, and the weight ratio of setting retarder to cellulose ether approximately 0.07:1 to 10:1, particularly approximately 0.12:1 to 7.5:1 and more particularly approximately 0.15:1 to 5:1. The lightweight filler used in the premix with respect to the bulk density and water absorption capacity is subject to the same criteria as those applying to the complete mortar mixture.

To the hydraulically setting mortar composition and/or premix can also be added in the usual quantities other additives. Such additives are known to the expert and are described in the literature. Selected examples are fillers or aggregates, dispersion powders, starch ethers, polycarboxylates, polyacrylamides, cellulose fibres, air-entraining agents, phyllosilicates, pozzolanes such as metakaolin, setting accelerators, particularly hardening accelerators, latent hydraulic components and/or thickeners.

As a result of the greatly increased action of the inventively used ratio of lightweight filler and cellulose ether and/or setting retarder, numerous advantages are acquired by the hydraulically setting mortar composition. Apart from reduced raw material and/or production costs these are improved use characteristics such as e.g. an improved open time, easy processability, high productiveness and, if desired, a good stability, higher adhesive tensile strengths and also wet, hot and frost-thaw storage and/or an improved horizontal deformation. As a result the inventive hydraulically setting mortar composition can be optimized for the most varied gypsum and/or cement-based mortars and plasters, such as e.g. tile adhesives, masonry mortars, plasters such as gypsum, gypsum-lime, lime-cement, cement and/or thermal plaster, thermal insulation mortars, smoothing mortars, self-levelling floor materials, repair mortars or mortars for wood applications such as on chipboards or plywood boards.

The premix according to the invention can be used in all the hydraulically setting mortars according to the invention. Apart from the already indicated advantages of the inventive hydraulically setting mortar composition, such a premix has numerous additional advantages. Thus, the production process is greatly simplified and only one instead of three or more components have to be added. This not only simplifies production, but logistics are also greatly simplified. It is also possible as a result of the process according to the invention to easily adapt a non-inventive formulation. Thus, e.g. the high lightweight filler proportion can be entirely replaced by the much smaller premix proportion in order to gain the indicated advantages. Or a lightweight filler formulation can as a result of the addition of a small amount of premix and slightly increasing the cement proportion, but without any significant adaptation, easily lead to a higher quality product with improved open time, much easier processability, improved productiveness, and, if desired, good stability, improved adhesive tensile strengths, as well as wet, hot and frost-thaw storage, together with improved horizontal deformation.

With the aid of non-limitative embodiments, advantages of the invention are described hereinafter.

Production of Premixes:

The components given in table 2 for the production of 300 g of a premix are precisely weighed in to a 1 litre vessel and mixed with a 60 mm propeller mixer for one minute at 300 to 1000 rpm.

TABLE 2

Composition (in wt.-%) of the premixes used:

| | Premix | | | | | | |
|---|---|---|---|---|---|---|---|
| | 1 | 2 | 3 | 4 | 5 | 6 | 7 |
| Aluminium-silicate (filler; WAC = 60)* | 46.0 | 50.0 | 48.0 | 0.0 | 0.0 | 0.0 | 0.0 |
| Calcium-silicate hydrate (WAC = 340) | 42.0 | 42.0 | 42.0 | 0.0 | 0.0 | 0.0 | 0.0 |
| Calcium-silicate hydrate (WAC = 123) | 0.0 | 0.0 | 0.0 | 93.5 | 93.5 | 64.5 | 68.0 |
| Aluminium-silicate (WAC = 128) | 0.0 | 0.0 | 0.0 | 0.0 | 0.0 | 31.0 | 27.3 |
| Setting retarder 1 | 8.0 | 4.0 | 6.0 | 0.0 | 0.0 | 1.5 | 1.5 |
| Setting retarder 2 | 0.0 | 0.0 | 0.0 | 2.0 | 2.0 | 0.0 | 0.0 |
| Cellulose ether (10,000 mPas)** | 2.5 | 2.5 | 2.5 | 0.0 | 3.0 | 2.0 | 2.2 |
| Cellulose ether (25,000 mPas)** | 0.0 | 0.0 | 0.0 | 3.0 | 0.0 | 0.0 | 0.0 |
| Starch ether (Eloset 5420) | 1.5 | 1.5 | 1.5 | 1.5 | 1.5 | 1.0 | 1.0 |

*This aluminium-silicate is referred to as a filler here, because it does not have the requisite water absorption capacity of the lightweight fillers according to the invention.
**Cellulose ethers which, as 2% aqueous solution, have a Brookfield viscosity of 10,000 or 25,000 mPas.

Description of the Use Tests:

For the use tests in each case 300 g of dry mortar mixture according to the formulations in examples 1 to 5 are produced, the dry mixture being thoroughly mixed with a mixer or stirrer in a 1 litre vessel. Accompanied by stirring the added mixing water quantity is then added and for 60 minutes mixed with a 60 mm propeller mixer at a speed of approximately 950 rpm. The mortar underwent evaluation with regards to the mixing behaviour (lump formation and wettability). Following a maturing time of 3 minutes the mortar was again briefly stirred by hand and evaluation took place of the consistency (creamy, thin, highly viscous, dry) and the change thereto during the maturing time (thickens afterwards).

For measuring the adhesive tensile strengths and open time, per storage, to concrete slabs, following a 0.skim, the mortar was applied with a 6×6×6 mm comb smoother with a 60° angle. The processability (appliability, wettability, surface tearing or splitting) was evaluated. Following an insertion time (IT) of 5 minutes (adhesive tensile strengths), respectively 20 or 30 minutes (open time, OT), 5×5 cm tiles were manually inserted in the mortar bed and weighted for 30 seconds with 2 kg. The measurement of the tensile adhesive strengths (according to CEN EN 1348) took place with clay tiles following the given storage ("dry": 28 days at 23° C. and 50% relative humidity, "wet": 7 days stored dry and then 21 days in the water bath), the open time (clay tiles, according to CEN EN 1346) was determined after dry storage for 28 days.

The horizontal deformation was determined according to EN 12002, the testpieces being stored at 23° C. The relative humidity for the first 14 days was set at 100% and for the next 14 days at 50%.

For determining the correctability according to DIN 18156, part 3, the mixed mortar was initially applied to a concrete slab, as for the adhesive tensile strength test. The pressed in clay tiles were, however, manually turned after 5 minutes to a limited extent by a 45° angle in one direction and then back again. This was repeated after a further 5 minutes until the tiles dropped. The indicated time corresponds to the time at which the tiles could on the last occasion be turned without dropping.

For determining the productiveness, firstly the volume of a 180 ml vessel was precisely determined by water filling. The mixed mortar was subsequently filled into the vessel ensuring that there were no air inclusions. The quotient of the mortar weight to the vessel volume gives the productiveness of the mortar, the mixing water proportion being subtracted from the mortar weight.

EXAMPLES AND COMPARISON EXAMPLES

By means of the examples the advantages of the invention are illustrated. If a premix is available, part or all the lightweight filler can be replaced by a much smaller premix proportion. The examples show that with the mortar formulations according to the invention the efficiency of the lightweight filler is significantly increased, so that as a rule equally good or even better use characteristics are obtained and raw material costs can even be reduced.

The adhesive tensile strengths after one day show that the setting behaviour of the mortar is not prejudiced by the increased setting retarder values. In part the 24 hour values have even better adhesion values than the comparative tests with less or no retarder.

Through a suitable choice of the ratios of lightweight filler to cellulose ether and setting retarder to cellulose ether, for equally good freshly mixed mortar characteristics, in part significantly improved adhesive tensile strengths, an improved open time and an improved correctability can be obtained. Expensive lightweight filler is significantly replaced by inexpensive filler or aggregate, such as quartz sand. The cellulose ether content can optionally also be reduced (Ex. 4a and 6), which leads to a much more cost effective formulation.

Comparative Example (Comp. Ex.) 1 and Example (Ex.) 1:

|  | Comp. Ex. 1 | Ex. 1 |
|---|---|---|
| Portland cement CEM I 52.5 | 40.0 | 40.0 |
| Quartz sand 0.1 to 0.3 mm | 50.0 | 54.0 |
| Aluminium-silicate (WAC = 128) | 6.0 | 0.0 |
| Setting accelerator | 1.0 | 1.0 |
| Cellulose ether (visc. 20,000 mPas) | 0.4 | 0.4 |
| Dispersion powder (Elotex 50E100) | 2.5 | 2.5 |
| Setting retarder 3 | 0.1 | 0.1 |
| Premix 1 |  | 2.0 |
| Mixing water | 30.0 | 30.0 |
| Lightweight filler on dry mortar (%) | 6.0 | 0.84 |
| Setting retarder on dry mortar (%) | 0.1 | 0.26 |
| Cellulose ether on dry mortar (%) | 0.4 | 0.45 |
| Lightweight filler to CE ratio | 15.0 | 1.87 |
| Setting retarder to CE ratio | 0.25 | 0.58 |
| Stirring/mixing behaviour | good | good |
| Consistency | light, creamy | light, creamy |
| Processability | good | good |
| Adhesive tensile strengths [N/mm2] (CEN EN 1348) dry (28 d) | 0.65 | 0.78 |
| wet (7 + 21 d) | 0.64 | 0.72 |
| OT (CEN EN 1346) 28 d IT 20 min [N/mm²] | 0.26 | 0.36 |

Comparative Example (Comp. Ex.) 2 and Examples (Ex.) 2:

|  | Comp. Ex. 2 | Comp. Ex. 2a | Ex. 2 | Ex. 2a |
|---|---|---|---|---|
| Portland cement Cem I 52.5 | 40.0 | 40.0 | 40.0 | 40.0 |
| Quartz sand 0.1-0.3 mm | 50.0 | 50.1 | 54.0 | 54.1 |
| Aluminium-silicon oxide (WAC = 163) | 6.0 | 6.0 |  |  |
| Setting accelerator | 1.0 | 1.0 | 1.0 | 1.0 |
| Cellulose ether (visc. 20,000 mPas) | 0.4 | 0.4 | 0.4 | 0.4 |
| Dispersion powder (Elotex 50E100) | 2.5 | 2.5 | 2.5 | 2.5 |
| Setting retarder 3 | 0.1 |  | 0.1 |  |
| Premix 1 |  |  | 2.0 | 2.0 |
| Mixing water | 30.0 | 30.0 | 28.0 | 28.0 |
| Lightweight filler on dry mortar (%) | 6.0 | 6.0 | 0.84 | 0.84 |
| Setting retarder on dry mortar (%) | 0.1 | 0 | 0.26 | 0.16 |
| Cellulose ether on dry mortar (%) | 0.4 | 0.4 | 0.45 | 0.45 |
| Lightweight filler to CE ratio | 15.0 | 15.0 | 1.87 | 1.87 |
| Setting retarder to CE ratio | 0.25 | 0 | 0.58 | 0.36 |
| Stirring/mixing behaviour | good | good | good | good |

|  | Comp. Ex. 2 | Comp. Ex. 2a | Ex. 2 | Ex. 2a |
|---|---|---|---|---|
| Consistency | light, creamy | light, creamy | light, creamy | light, creamy |
| Processability | good | good | good | good |
| Adhesive tensile strengths [N/mm$^2$] (CEN EN 1348) dry 1 d | 0.23 | 0.35 | 0.78 | 0.32 |
| dry (28 d) | 0.62 | 0.79 | 1.21 | 0.77 |
| wet (7 + 21 d) | 0.46 | 0.73 | 0.76 | 0.57 |
| OT (CEN EN 1346) IT 20 min [N/mm$^2$] 28 d | 0.41 | 0.57 | 0.54 | 0.29 |
| Correctability (DIN 18156 part 3) [min] | 15 | 15 | 30 | 20 |
| Productiveness [g/cm$^3$] | 1.13 | 1.15 | 1.14 | 1.18 |

Comparative Example (Comp. Ex.) 3 and Example (Ex.) 3:

|  | Comp. Ex. 3 | Ex. 3 |
|---|---|---|
| Portland cement Cem I 52.5 | 40.0 | 40.0 |
| Quarz sand 0.1-0.3 mm | 46.0 | 54.0 |
| Calcium-aluminium-silicate (WAC = 142) | 10.0 | |
| Setting accelerator | 1.0 | 1.0 |
| Cellulose ether (visc. 20,000 mPas) | 0.4 | 0.4 |
| Dispersion powder (Elotex 50E100) | 2.5 | 2.5 |
| Setting retarder 3 | 0.1 | 0.1 |
| Premix 2 | | 2.0 |
| Mixing water | 30.0 | 30.0 |
| Lightweight filler on dry mortar (%) | 10.0 | 0.84 |
| Setting retarder on dry mortar (%) | 0.1 | 0.18 |
| Cellulose ether on dry mortar (%) | 0.4 | 0.45 |
| Lightweight filler to CE ratio | 25.0 | 1.87 |
| Setting retarder to CE ratio | 0.25 | 0.40 |
| Stirring/mixing behaviour | good | good |
| Consistency | light, creamy | light, creamy |
| Processability | good | good |
| Adhesive tensile strengths [N/mm$^2$] (CEN EN 1348) dry 1 day | 0.26 | 0.41 |
| dry (28 d) | 0.48 | 0.84 |
| wet (7 + 21 d) | 0.65 | 0.97 |
| OT (CEN EN 1346) IT 20 min [N/mm$^2$] 1 d | 0.15 | 0.23 |
| 28 d | 0.36 | 0.64 |
| Productiveness [g/cm$^3$] | 1.12 | 1.15 |

Comparative Example (Comp. Ex.) 4 and Examples (Ex.) 4 and 4a:

|  | Comp. Ex. 4 | Ex. 4 (CE content same) | Ex. 4a (CE content reduced) |
|---|---|---|---|
| Portland cement Cem I 52.5 | 40.0 | 40.0 | 40.0 |
| Quarz sand 0.1-0.3 mm | 46.0 | 53.0 | 53.14 |
| Calcium-aluminium-silicate (WAC = 142) | 10.0 | | |
| Setting accelerator | 1.0 | 1.0 | 1.0 |
| Cellulose ether (visc. 20,000 mPas) | 0.4 | 0.4 | 0.26 |
| Dispersion powder (Elotex 50E100) | 2.5 | 2.5 | 2.5 |
| Setting retarder 3 | 0.1 | 0.1 | 0.1 |
| Premix 3 | | 3.0 | 3.0 |
| Mixing water | 25.0 | 28.3 | 28.3 |
| Lightweight filler on dry mortar (%) | 10.0 | 1.26 | 1.26 |
| Setting retarder on dry mortar (%) | 0.1 | 0.28 | 0.28 |
| Cellulose ether on dry mortar (%) | 0.4 | 0.48 | 0.34 |
| Lightweight filler to CE ratio | 25.0 | 2.63 | 3.71 |
| Setting retarder to CE ratio | 0.25 | 0.58 | 0.82 |
| Stirring/mixing behaviour | good | good | good |
| Consistency | light, creamy | light, creamy | light, creamy |
| Processability | good | good | good |
| Adhesive tensile strengths (CEN EN 1348) [N/mm$^2$] dry 1 d | 0.17 | | 0.23 |
| dry (28 d) | 1.03 | 1.12 | 1.28 |
| wet (7 + 21 d) | 0.95 | 0.49 | 1.22 |
| OT (CEN EN 1346) IT 20 min [N/mm$^2$] 28 d | 0.13 | 0.57 | 0.59 |
| Correctability (DIN 18156, part 3) [min] | 15 | 15 | 10 |
| Productiveness [g/cm$^3$] | 1.14 | 1.14 | 1.17 |

Comparative Example (Comp. Ex.) 5 and 5a and Examples (Ex.) 5 and 5a:

|  | Comp. Ex. 5 | Comp. Ex. 5a | Ex. 5 | Ex. 5a |
|---|---|---|---|---|
| Portland cement Cem I 52.5 | 50.0 | 50.0 | 50.0 | 50.0 |
| Microcement | 4.0 | 4.0 | 4.0 | 4.0 |
| Quartz sand 0.1-0.3 mm | 19.77 | 19.80 | 26.77 | 26.80 |
| Aluminium-silicate (WAC = 128) | 2.0 | 2.0 | 2.0 | 2.0 |
| Calcium-aluminium-silicate (WAC = 142) | 18.0 | 18.0 | 8.0 | 8.0 |
| Cellulose fibres | 0.60 | 0.60 | 0.60 | 0.60 |
| Setting accelerator | 1.0 | 1.0 | 1.0 | 1.0 |
| Cellulose ether (visc. 10,000 mPas) | 0.6 | 0.6 | 0.6 | 0.6 |
| Dispersion powder (Elotex FX3300) | 4.0 | 4.0 | 4.0 | 4.0 |
| Setting retarder 1 | 0.03 |  | 0.03 |  |
| Premix 4 |  |  | 3.0 | 3.0 |
| Mixing water | 55.0 | 55.0 | 52.0 | 52.0 |
| Lightweight filler on dry mortar (%) | 20.0 | 20.0 | 12.81 | 12.81 |
| Setting retarder on dry mortar (%) | 0.03 | 0 | 0.09 | 0.06 |
| Cellulose ether on dry mortar (%) | 0.6 | 0.6 | 0.69 | 0.69 |
| Lightweight filler to CE ratio | 33.3 | 33.3 | 18.56 | 18.56 |
| Setting retarder to CE ratio | 0.05 | 0 | 0.13 | 0.09 |
| Stirring/mixing behaviour | good | good | good | good |
| Consistency | light, creamy | light, creamy | light, creamy | light, creamy |
| Processability | good | good | good | good |
| Adhesive tensile strengths (CEN EN 1348) [N/mm$^2$] dry (28 d) | 0.90 | 1.02 | 0.97 | 1.11 |
| wet (7 + 21 d) | 0.46 | 0.52 | 0.52 | 0.66 |
| OT (CEN EN 1346) IT 30 min [N/mm$^2$] 1 d | 0.34 | 0.35 | 0.33 | 0.46 |
| 28 d | 0.75 | 0.82 | 0.68 | 0.85 |
| Horizontal deformation (CEN TC67/WG) max. force [N] | 4.62 | 1.23 | 5.23 | 5.40 |
| deformability [mm] | 2.59 | 1.43 | 2.44 | 2.50 |
| Correctability (DIN 18156 part 3) [min] | 15 | 15 | 20 | 20 |
| Productiveness [g/cm$^3$] | 0.79 | 0.79 | 0.87 | 0.88 |

Comparative Example (Comp. Ex.) 6 and Example (Ex.) 6:

|  | Comp. Ex. 6 | Ex. 6 |
|---|---|---|
| Portland cement Cem I 52.5 | 50.0 | 50.0 |
| Microcement | 4.0 | 4.0 |
| Quartz sand 0.1-0.3 mm | 19.77 | 26.97 |
| Aluminium-silicate (WAC = 128) | 2.0 | 2.0 |
| Calcium-aluminium-silicate (WAC = 142) | 18.0 | 8.0 |
| Cellulose fibres | 0.60 | 0.60 |
| Setting accelerator | 1.0 | 1.0 |
| Cellulose ether (visc. 10,000 mPas) | 0.6 | 0.4 |
| Dispersion powder (Elotex FX3300) | 4.0 | 4.0 |
| Setting retarder 1 | 0.03 | 0.03 |
| Premix 5 |  | 3.0 |
| Mixing water | 60.0 | 59.0 |
| Lightweight filler on dry mortar (%) | 20.0 | 12.81 |
| Setting retarder on dry mortar (%) | 0.03 | 0.09 |
| Cellulose ether on dry mortar (%) | 0.6 | 0.49 |
| Lightweight filler to CE ratio | 33.3 | 26.13 |
| Setting retarder to CE ratio | 0.05 | 0.18 |
| Stirring/mixing behaviour | good | good |
| Consistency | light, creamy | light, creamy |
| Processability | good | good |
| Adhesive tensile strengths (CEN EN 1348) [N/mm$^2$] dry (28 d) | 0.88 | 0.91 |
| wet (7 + 21 d) | 0.67 | 0.69 |
| OT (CEN EN 1346) IT 30 min [N/mm$^2$] 1 d | 0.49 | 0.44 |
| 28 d | 0.53 | 0.54 |
| Horizontal deformation (CEN TC67/WG) max. force [N] | 4.64 | 4.95 |
| deformability [mm] | 2.35 | 2.24 |
| Productiveness [g/cm$^3$] | 0.83 | 0.86 |

Comparative Example (Comp. Ex.) 7 and Example (Ex. 7 and 7a):

|  | Comp. Ex. 7 | Ex. 7 | Ex. 7a |
|---|---|---|---|
| Portland cement Cem I 52.5 | 55.0 | 55.0 | 55.0 |
| Microcement | 4.0 | 4.0 | 4.0 |
| Quartz sand 0.1-0.3 mm | 14.4 | 27.9 | 27.1 |

-continued

|  |  | Comp. Ex. 7 | Ex. 7 | Ex. 7a |
|---|---|---|---|---|
| Aluminium-silicate (WAC = 128) | | 2.0 | | |
| Calcium-aluminium-silicate (WAC = 142) | | 18.0 | | |
| Cellulose fibres | | 1.0 | 1.0 | 1.0 |
| Setting accelerator | | 1.0 | 1.0 | 1.0 |
| Cellulose ether (visc. 10,000 mPas) | | 0.6 | 0.6 | 0.6 |
| Dispersion powder (Elotex FX3300) | | 4.0 | 4.0 | 4.0 |
| Premix 6 | | | 6.5 | |
| Premix 7 | | | | 7.3 |
| Mixing water | | 59.0 | 59.0 | 59.0 |
| Lightweight filler on dry mortar (%) | | 20.0 | 6.21 | 6.96 |
| Setting retarder on dry mortar (%) | | 0.0 | 0.10 | 0.11 |
| Cellulose ether on dry mortar (%) | | 0.6 | 0.70 | 0.71 |
| Lightweight filler to CE ratio | | 33.3 | 8.87 | 9.80 |
| Setting retarder to CE ratio | | 0.0 | 0.14 | 0.15 |
| Stirring/mixing behaviour | | good, thin consistency | good, thin consistency | good, thin consistency |
| Consistency | | light, creamy, thickened | light, creamy, thickened | light, creamy, thickened |
| Processability | | good | good | good |
| Adhesive tensile strength (CEN EN 1348) [N/mm²] | dry (28 d) | 0.99 | 0.98 | 0.97 |
| | wet (7 + 21 d) | 0.70 | 0.63 | 0.50 |
| OT (CEN EN 1346) IT 30 min [N/mm²] | 1 d | 0.41 | 0.39 | 0.33 |
| | 28 d | 0.69 | 0.69 | 0.73 |
| Horizontal deformation (CEN TC67/WG) | max. force [N] | 4.99 | 5.54 | 5.73 |
| | deformability [mm] | 2.41 | 2.37 | 2.53 |
| Correctability (DIN 18156 part 3) [min] | | 10 | 15 | 20 |
| Productiveness [g/cm³] | | 0.69 | 0.85 | 0.85 |

I claim:

1. A hydraulically setting mortar composition containing at least one hydraulically setting component, at least one lightweight filler, at least one cellulose ether, at least one setting retarder and optionally further additional additives, including fillers and dispersion powders, wherein:
   a. for a mixing water requirement of approximately 20 to 45 wt. %, based on the dry content of the mortar composition,
   a1. the weight ratio of the lightweight filler to the cellulose ether is approximately 0.001:1 to 10:1 and
   a2. the weight ratio of the setting retarder to the cellulose ether is approximately 0.3:1 to 10:1 and
   b. in the case of a mixing water requirement of approximately 45 to 100 wt. %, based on the dry content of the mortar composition,
   b1. the weight ratio of lightweight filler to cellulose ether is approximately 0.01:1 to 30:1 and
   b2. the weight ratio of setting retarder to cellulose ether is 0.07:1 to 10:1 and
   c. the lightweight filler used has a bulk density of less than approximately 600 g/l and at ambient temperature a water absorption capacity of approximately 80 wt. % or higher;
   wherein at least one hydraulically setting component is a Portland cement.

2. The hydraulically setting mortar composition according to claim 1, wherein the proportion of hydraulically setting component is approximately 5 to 70 wt. %, lightweight filler approximately 0.1 to 25 wt. %, cellulose ether approximately 0.02 to 3.0 wt. %, setting retarder approximately 0.01 to 2 wt. %, filler approximately 0 to 70 wt. %, and/or dispersion powder approximately 0 to 25 wt. %, in each case based on the dry mortar composition.

3. The hydraulically setting mortar composition according to claim 1, wherein the hydraulically setting component is Portland cement or a mixture of Portland cement, calcium sulphate and high-alumina cement, the filler is quartz sand and calcium carbonate and the dispersion powder is in the form of one or more copolymers based on $C_1$ to $C_{12}$ vinyl ester, ethylene, vinyl chloride, and/or $C_1$ to $C_{12}$ alkyl ester of (meth)acrylic acid.

4. The hydraulically setting mortar composition according to claim 1, wherein the setting retarder is a $C_4$ to $C_{12}$ polyhydroxy compound.

5. The hydraulically setting mortar composition according to claim 1, further comprising a lightweight filler having a synthetic or natural basis in the form of hollow microspheres of glass, aluminium-silicate, calcium-silicate hydrate, calcium-metasilicate, and/or calcium-aluminium-silicate.

6. The hydraulically setting mortar composition according to claim 1, wherein the bulk density of the lightweight filler is below 500 g/l.

7. The hydraulically setting mortar composition according to claim 1, wherein the mortar composition in the case of a mixing water requirement of approximately 20 to 45 wt. %, based on the dry content of the mortar composition, contains the lightweight filler in a quantity of approximately 0.1 to 5 wt. %, based on the dry mortar composition, and for a mixing water requirement of approximately 45 to 100 wt. %, based on the dry content of the mortar composition, contains the lightweight filler in a quantity of approximately 1 to 15 wt. %, based on the total dry mortar composition.

8. The hydraulically setting mortar composition according to claim 1, wherein the lightweight filler used, at ambient temperature, has a water absorption capacity of approximately 100 wt. % or higher.

9. The hydraulically setting mortar composition according to claim 1, wherein the lightweight filler or at least one of the lightweight fillers used has a platelet-shaped, pin-shaped and/or lamellar structure.

10. The hydraulically setting mortar composition according to claim 1, wherein the cellulose ether is an alkyl hydroxyalkyl cellulose ether and/or an alkyl cellulose ether.

11. The hydraulically setting mortar composition according to claim 10, wherein the alkyl groups of the alkyl hydroxyalkyl cellulose ether and/or the alkyl cellulose ether are methyl and/or ethyl groups, and the hydroxyalkyl groups of the alkyl hydroxyalkyl cellulose ether are hydroxyethyl groups.

12. The hydraulically setting mortar composition according to claim 1, wherein the cellulose ether as a 2% aqueous solution at 20° C. has a Brookfield viscosity (measured at 20 rpm) of approximately 1,000 to 100,000 mPas.

13. The hydraulically setting mortar composition according to claim 1, wherein the cellulose ether or part thereof is replaced by an alkyl hydroxyalkyl-modified polysaccharide.

14. The hydraulically setting mortar composition according to claim 1, wherein:
   a. for a mixing water requirement of approximately 20 to 45 wt. %, based on the dry content of the mortar composition,
      a.1 the weight ratio of the lightweight filler to the cellulose ether is approximately 0.01:1 to 7.5:1, and
      a.2 the weight ratio of setting retarder to cellulose ether is approximately 0.4:1 to 7.5:1, and
   b. for a mixing water requirement of approximately 45 to 100 wt. % or higher, based on the dry content of the mortar composition,
      b1. the weight ratio of lightweight filler to cellulose ether is approximately 0.1:1 to 25:1, and
      b2. the weight ratio of setting retarder to cellulose ether is approximately 0.09:1 to 7.5:1.

15. The hydraulically setting mortar composition according to claim 14, wherein the further additives are in the form of fillers, dispersion powders, starch ethers, guar ethers, polycarboxylates, polyacrylamides, cellulose fibres, air-entraining agents, phyllosilicates, pozzolanes, setting accelerators, latent hydraulic components and/or thickeners.

16. A method of using the hydraulically setting mortar composition of claim 1 as gypsum, gypsum-lime, lime-cement, cement and/or thermal plaster, tile adhesive, masonry mortar, thermal insulation mortars, smoothing mortars, self-levelling floor materials or repair mortars.

17. A premix for producing a hydraulically setting mortar composition, wherein the premix contains at least one lightweight filler and at least one cellulose ether and/or at least one setting retarder, in which
   a. the weight ratio of lightweight filler to cellulose ether is approximately 0.001:1 to 100:1, and/or
   b. the weight ratio of lightweight filler to setting retarder is approximately 0.01:1 to 100:1, and
   c. the lightweight filler used has a bulk density of below approximately 600 g/l and at ambient temperature has a water absorption capacity of approximately 80 wt. %, or higher.

18. The premix for producing a hydraulically setting mortar composition according to claim 17, wherein the premix contains at least one lightweight filler, at least one cellulose ether and at least one setting retarder, the weight ratio of setting retarder to cellulose ether being approximately 0.07:1 to 10:1.

19. The premix according to claim 17, wherein the premix contains further additives, selected from the group consisting of dispersion powders, fillers, starch ethers, guar ethers, polycarboxylates, polyacrylamides, cellulose fibres, air-entraining agents, phyllosilicates, pozzolanes, metakaolin, setting accelerators, latent hydraulic components and thickeners.

20. A process for the production of a premix according to claim 19, wherein the lightweight filler, cellulose ether, setting retarder and/or dispersion powder, as well as optionally further additives are intermixed, part or all, based on the hydraulically setting mortar composition, of the lightweight filler, cellulose ether, setting retarder and/or dispersion powder being contained in the premix, and the premix is used for producing a hydraulically setting mortar composition.

21. A process of using the premix according to claim 17 in gypsum, gypsum-lime, lime-cement, cement and/or thermal plasters, tile adhesives, masonry mortars, thermal insulation mortars, smooth mortars, self-levelling floor materials or repair mortars.

22. The hydraulically setting mortar composition according to claim 1, wherein the hydraulically setting component is Portland cement or a mixture of Portland cement, calcium sulphate and high-alumina cement, the filler is quartz sand and calcium carbonate and the dispersion powder is in the form of one or more copolymers based on $C_1$ to $C_{12}$ alkyl ester of (meth)acrylic acid and styrene.

23. The hydraulically setting mortar composition according to claim 1, wherein the setting retarder is an organic carboxylic acid, the organic carboxylic acid being citric acid, tartaric acid, and/or gluconic acid and/or the alkali metal salt thereof.

* * * * *